(12) United States Patent
Breedvelt-Schouten et al.

(10) Patent No.: US 10,176,161 B2
(45) Date of Patent: Jan. 8, 2019

(54) DETECTION OF EMOTIONAL INDICATIONS IN INFORMATION ARTEFACTS (71) Applicant: International Business Machines Corporation, Armonk, NY (US)

(72) Inventors: Ilse M. Breedvelt-Schouten, Manotick (CA); Jana H. Jenkins, Raleigh, NC (US); Jeffrey A. Kusnitz, Campbell, CA (US); John A. Lyons, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 66 days.

(21) Appl. No.: 15/008,486

(22) Filed: Jan. 28, 2016

(65) Prior Publication Data

US 2017/0220553 A1    Aug. 3, 2017

(51) Int. Cl.
G06F 17/27    (2006.01)
(52) U.S. Cl.
CPC ........ G06F 17/274 (2013.01); G06F 17/2785 (2013.01)
(58) Field of Classification Search
CPC ............... G06F 17/2785; G06F 17/277; G06F 17/30684; G06F 2203/011; G10L 25/63; G10L 2015/227
USPC ...................................... 704/9, 10
See application file for complete search history.

(56) References Cited

U.S. PATENT DOCUMENTS 7,137,070 B2 * 11/2006 Brown ................... G06Q 30/02
704/10
7,181,693 B1 2/2007 Anderson et al.
8,041,344 B1 10/2011 Coughlan et al.
8,583,148 B2 11/2013 Ollila et al.
9,619,980 B2 * 4/2017 Cruz-Hernandez ...... G08B 6/00
2002/0199166 A1 * 12/2002 Volcani ............... G06F 17/5072
716/129

(Continued)

FOREIGN PATENT DOCUMENTS

EP    2515760 B1    2/2014

OTHER PUBLICATIONS

Akkiraju, Rama, "IBM Watson Tone Analyzer—new service now available", Jul. 16, 2015, 12 pages, <https://developer.ibm.com/watson/blog/2015/07/16/ibm-watson-tone-analyzer-service-experimental-release-announcement/>.

(Continued)

Primary Examiner — Olujimi Adesanya
(74) Attorney, Agent, or Firm — Edward J. Wixted, III (57) ABSTRACT A computer-implemented method includes determining one or more information artifacts and determining at least one of one or more input properties or one or more content properties. The one or more input properties and the one or more content properties are each associated with the one or more information artifacts. The computer-implemented method further includes determining whether the one or more input information artifacts comprise one or more emotional indications based on at least one of the one or more input properties or the one or more content properties. The computer-implemented method further includes determining whether to perform one or more responsive actions based on the one or more emotional indications. A corresponding computer program product and computer system are also disclosed.

17 Claims, 6 Drawing Sheets

(56) References Cited

U.S. PATENT DOCUMENTS

| | | | |
|---|---|---|---|
| 2003/0069936 A1* | 4/2003 | Warner | G06F 17/271 709/206 |
| 2006/0129405 A1 | 6/2006 | Elfanbaum | |
| 2008/0091515 A1* | 4/2008 | Thieberger | G06Q 10/04 705/7.11 |
| 2008/0096533 A1* | 4/2008 | Manfredi | G06N 3/006 455/412.1 |
| 2011/0040155 A1* | 2/2011 | Guzak | A61B 5/16 600/300 |
| 2011/0294525 A1* | 12/2011 | Jonsson | G06F 17/27 455/466 |
| 2012/0311032 A1* | 12/2012 | Murphy | G07F 17/3225 709/204 |
| 2013/0253910 A1* | 9/2013 | Turner | G06F 17/274 704/9 |
| 2014/0074945 A1* | 3/2014 | Kanevsky | A61B 5/165 709/206 |
| 2014/0114899 A1* | 4/2014 | Wan | G06N 5/04 706/47 |
| 2014/0244264 A1* | 8/2014 | Thirumalainambi | G06F 17/2785 704/270 |
| 2014/0316765 A1 | 10/2014 | Fitterer et al. | |
| 2016/0063874 A1* | 3/2016 | Czerwinski | G09B 5/06 434/236 |

OTHER PUBLICATIONS

Gao et al. "What does touch tell us about emotions in touchscreen-based gameplay?", ACM Transactions on Computer-Human Interaction, vol. 19, No. 4, Article 31, Publication date: Dec. 2012, © 2012 ACM, DOI10.1145/0000000.0000000, 30 pages.

Klein, Jonathan T., "Computer Response to User Frustration", Also referenced as: MIT Media Laboratory Vision and Modeling Group Technical Report TR#480, (Note: This technical report has been updated as of Nov. 22, 2000 to accommodate a minor change to Appendix A), Submitted to the Program in Media Arts and Sciences on Sep. 10, 1998, in partial fulfillment of the requirements for the degree of Master of Science in Media Arts and Sciences, © Massachusetts Institute of Technology, 1998, 176 pages, <http://vismod.media.mit.edu/tech-reports/TR-480.pdf>.

Shivhare et al., "Emotion Detection From Text", Department of CSE and IT, Maulana Azad National Institute of Technology, Bhopal, Madhya Pradesh, India, printed on Nov. 13, 2015, 7 pages, <http://arxiv.org/ftp/arxiv/papers/1205/1205.4944.pdf>.

Strapparava et al., "Learning to Identify Emotions in Text", SAC'08, Mar. 16-20, 2008, Fortaleza, Ceara, Brazil, copyright 2008 ACM 978-1-59593-753-7/08/0003, 5 pages, <http://www.lirmm.fr/~aze/docs/articles/article-3.pdf>.

Zimmermann et al., "Affective Computing—A Rationale for Measuring Mood With Mouse and Keyboard", Article in International Journal of Occupational Safety and Ergonomics: Jose—Feb. 2003, Swiss Federal Institute of Technology, Zurich, Switzerland, Available from Philippe G. Zimmermann, Retrieved on: Nov. 13, 2015, 12 pages, DOI: 10.1080/10803548.2003.11076589.

"Emotional spellcheck for Email", ToneCheck™ by Lymbix, © 2011 Lymbix Inc., 2 pages, printed on Nov. 13, 2015, <http://tonecheck.com/? lsa=1eda-1bdb - text analysis>.

"Is it possible to guess a user's mood based on the structure of text?", Stack Overflow, printed on Nov. 13, 2015, 5 pages, <http://stackoverflow.com/questions/933212/is-it-possible-to-guess-a-users-mood-based-on-the-structure-of-text>.

* cited by examiner

Hi Josh,

After today's meeting, I really was a bit shocked to hear what you
411 said about the product. I thought you agreed with the approach, but
412 now we seem to disagree, and I am not sure we can get aligned
413 with what the target audience is. Can we please meet and discuss this as soon as possible?
414

DETECTION OF EMOTIONAL INDICATIONS IN INFORMATION ARTEFACTS

BACKGROUND

The present invention relates generally to the field of digital information artefact analysis, and more particularly to detecting and rendering of emotional indications in such information artefacts.

Detection of emotional indications in information artefacts is a challenging task as information artefacts do not carry direct and explicit indications of their emotional significance. Developers and users of computer systems continue to face challenges with detecting emotional indications in information artefacts.

SUMMARY

A computer-implemented method includes determining one or more information artefacts and determining at least one of one or more input properties or one or more content properties. The one or more input properties and the one or more content properties are each associated with the one or more information artefacts. The computer-implemented method further includes determining whether the one or more input information artefacts comprise one or more emotional indications based on at least one of the one or more input properties or the one or more content properties. The computer-implemented method further includes determining whether to perform one or more responsive actions based on the one or more emotional indications. A corresponding computer program product and computer system are also disclosed.

DETAILED DESCRIPTION

Figure 1:
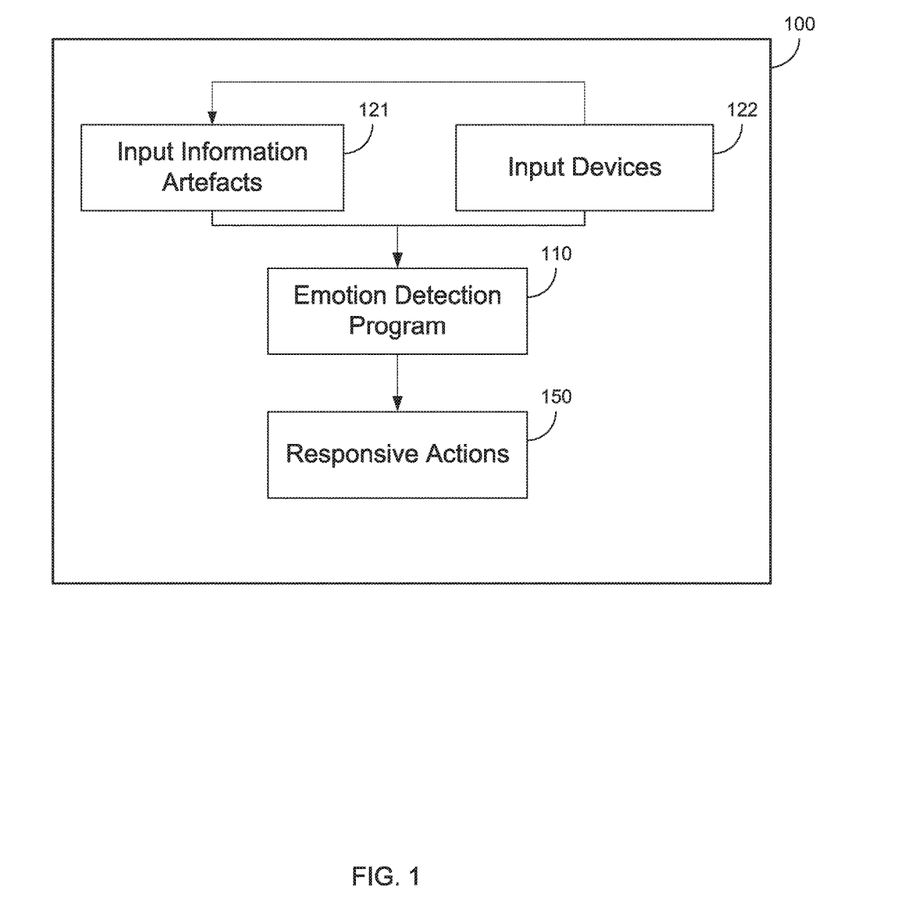
FIG. 1 is a block diagram of one embodiment of a computer system environment suitable for operation of an emotion detection program, in accordance with at least one embodiment of the present invention.

FIG. 1 is a block diagram of a computer system environment 100 suitable for operating an emotion detection program 110, in accordance with at least one embodiment of the present invention. In the computer system environment 100 depicted in FIG. 1, an input information artefact 121 is any combination of one or more bits, including one or more quantum bits, received in at least one time, in whole or in part and directly or indirectly, through at least one input device 122. An input device 122 is any device that, in whole or in part and directly or indirectly, receives at least one information artefact and/or one control signal caused to be issued by at least one user of at least one electronic device (e.g., a at least one computer device).

In the computer system environment 100 depicted in FIG. 1, the emotion detection program 110 uses one or more data artefacts derived from and/or associated with one or more input information artefacts 121 and one or more input devices 122 to determine one or more responsive actions 150. In at least some embodiments, one or more data artefacts derived from and/or associated with one or more input devices 122 include one or more data artefacts derived from and/or associated with at least one information artefact and/or one control signal received by at least one of the one or more input device 122. In at least some embodiments, a responsive action is any action determined, in whole or in part and directly or indirectly, by the emotion detection program 110 based on at least one of one or more data artefacts derived from and/or associated with one or more input information artefacts 121 or one or more information artefacts derived from and/or associated with one or more input devices 122.

Figure 2:
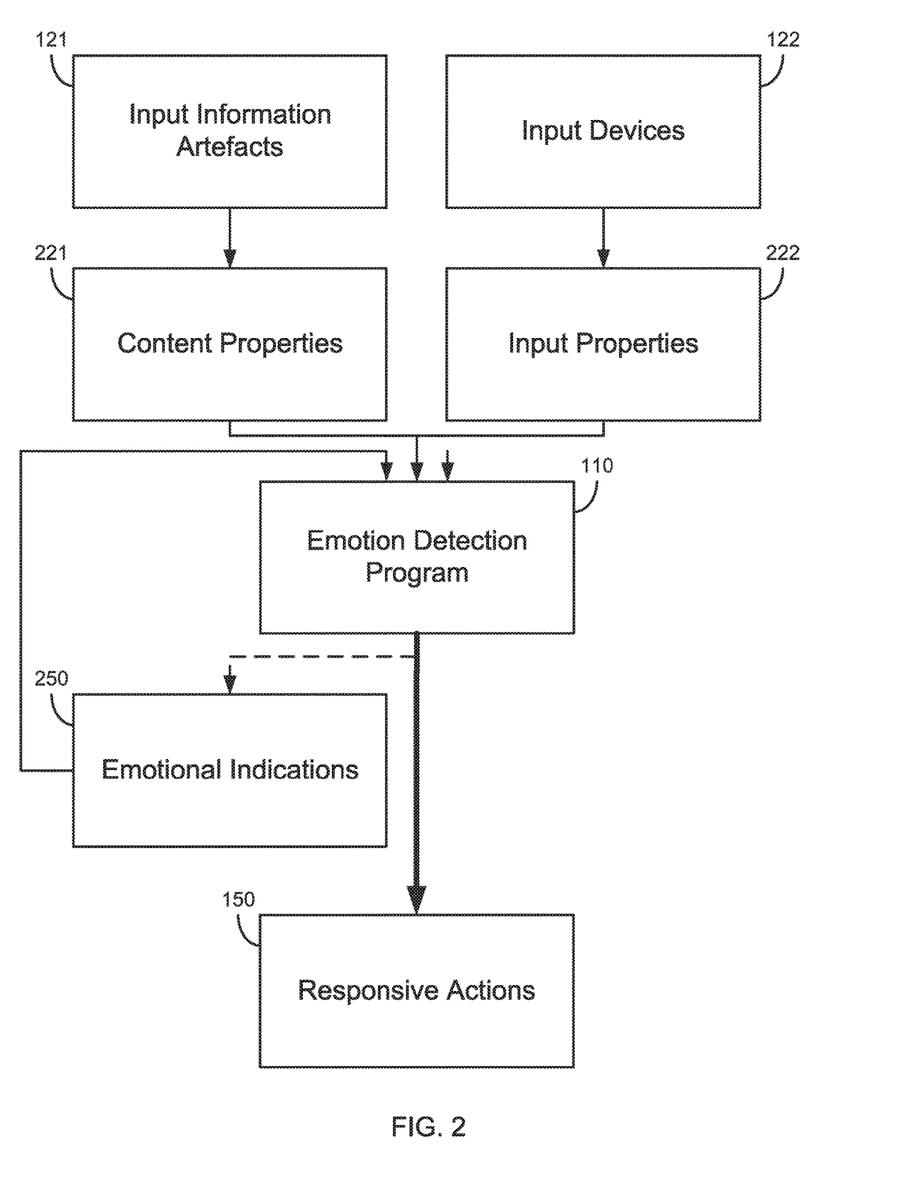
FIG. 2 is a data-flow diagram of an emotion detection program, in accordance with at least one embodiment of the present invention.

FIG. 2 is a data-flow diagram for an emotion detection program 110, in accordance with at least one embodiment of the present invention. In the embodiment depicted in FIG. 2, one or more content properties 221 are derived from and/or are associated with the one or more input information artefacts 121, while one or more input properties 222 are derived from and/or are associated with the one or more input devices 122. In at least some embodiments, a content property 221 is any property, in whole or in part and directly or indirectly, derived from and/or associated with the one or more input information artefacts 121. In at least some embodiments, an input property 222 is any property, in whole or in part and directly or indirectly, derived from and/or associated with the one or more input devices 121.

In the embodiment depicted in FIG. 2, the emotion detection program 110 uses the one or more content properties 221 and the one or more input properties 222 to determine one or more emotional indications 250. In at least some embodiments, an emotional indication 250 is any indication of definite or probable (e.g., with a predefined threshold level of probability, such as 90% probability) content of emotional severity, where the emotional severity is, in whole or in part and directly or indirectly, identified and/or determined based on the one or more content properties 221 and the one or more input properties 222 (e.g., using one or more emotional severity determination guidelines). The emotion detection program 110 determines the one or more responsive actions 150.

Figure 3:
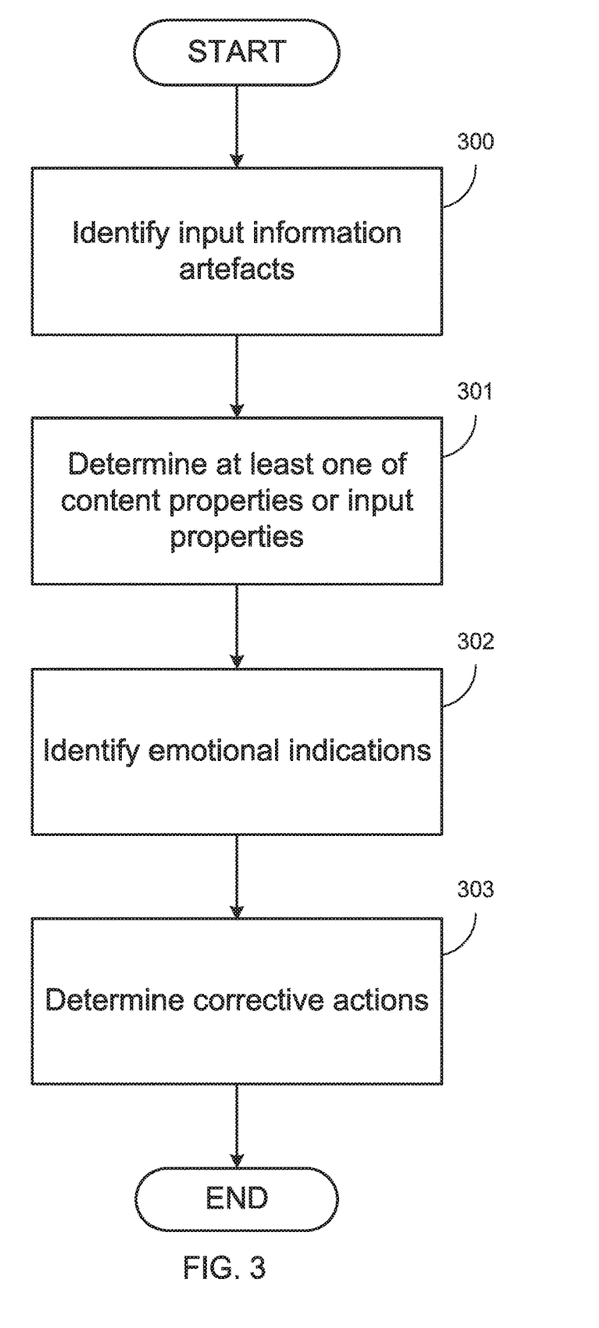
FIG. 3 is a flow-chart diagram of an emotion detection program, in accordance with at least one embodiment of the present invention.

FIG. 3 is a flow-chart diagram for an emotion detection program, in accordance with at least one embodiment of the present invention. At step 300, the program identifies one or more input information artefacts. At step 301, the program determines at least one of one or more input properties or one or more content properties, where the one or more input properties and the one or more content properties each are associated with the one or more input information artefacts. At step 302, the program determines whether the one or more input information artefacts comprise one or more emotional indications based on at least one of the one or more input properties or the one or more content properties. At step 303, the program determines whether to perform one or more responsive actions based on the one or more emotional indications.

In some embodiments, the one or more responsive actions comprise at least one action selected from the group consisting of: (i) displaying one or more emotional indication identifiers; (ii) determining an emotional hierarchical profile associated with the one or more input information artefacts; (iii) determining one or more corrective suggestions based on the one or more emotional indications; (iv) determining one or more notification prompts based on the one or more emotional indications; and (v) determining at least one emotional stabilization strategy.

In at least some embodiments, an emotional indication identifier is any indication of at least one emotional indication displayed and/or conveyed to at least one user of at least one computer system environment. In at least some embodiments, an emotional hierarchical profile associated with the one or more input information artefacts is any indication of at least one emotional indication determined based on one or more properties (including one or more content properties and/or one or more input properties) associated with the one or more input information artefacts. In some embodiments, an emotional hierarchical profile further includes an indication of the hierarchy, grouping, and/or ordering of the at least one emotional indication based on the emotional severity associated with the at least one emotional indication.

In at least some embodiments, a corrective suggestion determined based on the one or more emotional indications is any indication of at least one alternative phrasing determined for at least one of the one or more emotional indications. In at least some embodiments, an emotional stabilization strategy is any indication of at least one recommendation and/or requirement determined based on the one or more emotional indications (e.g., intending to invite the user to take one or more actions and/or wait a period of time before attempting to transmit an indication of the one or more input information artefacts to at least one recipient).

Figure 4:
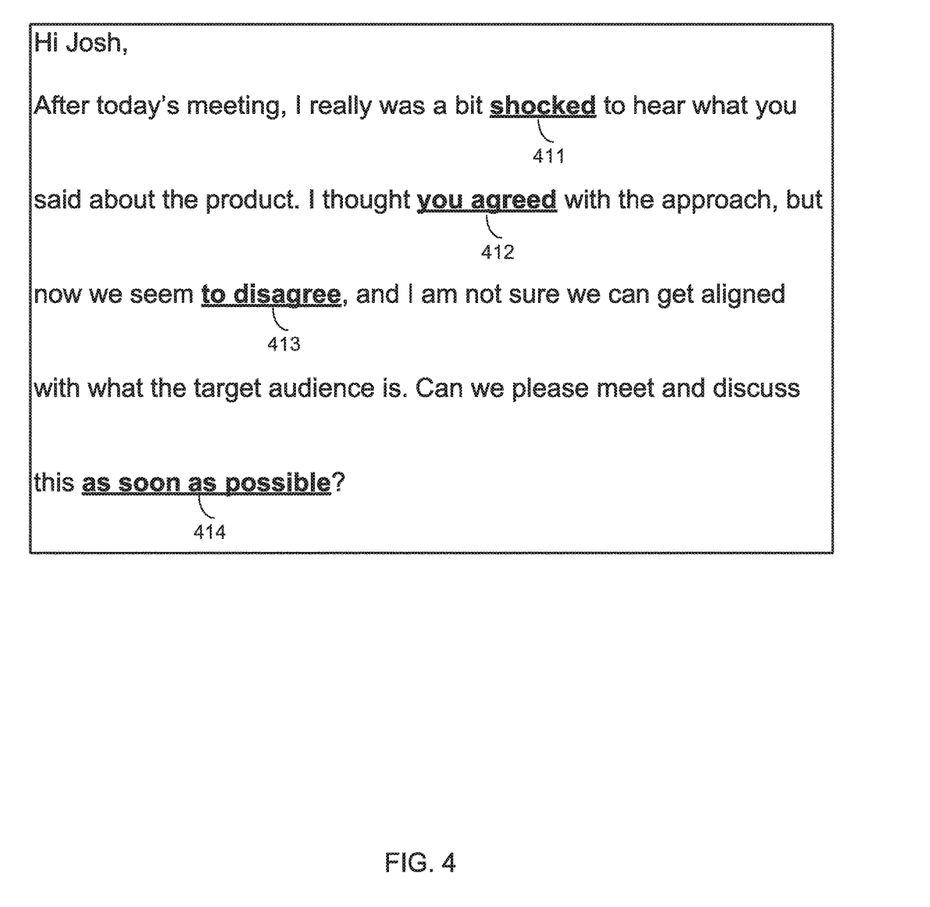
FIG. 4 is an operational example of emotional indication identifiers, in accordance with at least one embodiment of the present invention.
Figure 5A:
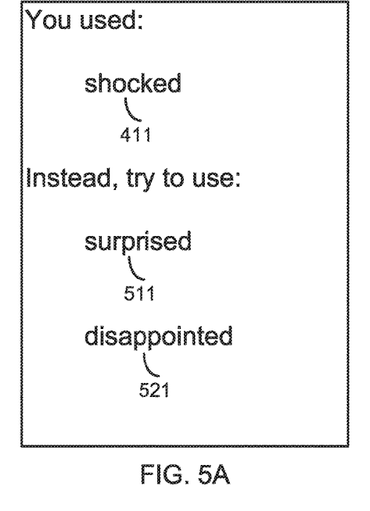
FIGS. 5A, 5B, 5C, and 5D depict operational examples of corrective suggestions, in accordance with at least one embodiment of the present invention.
Figure 5B:
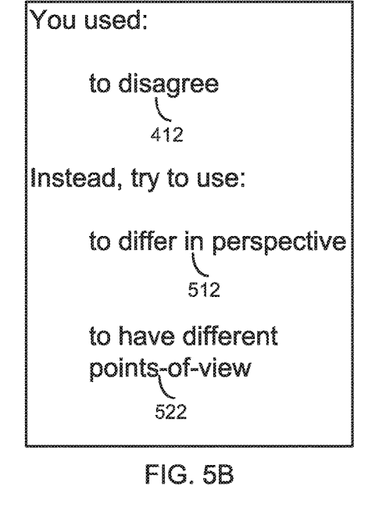
Figure 5C:
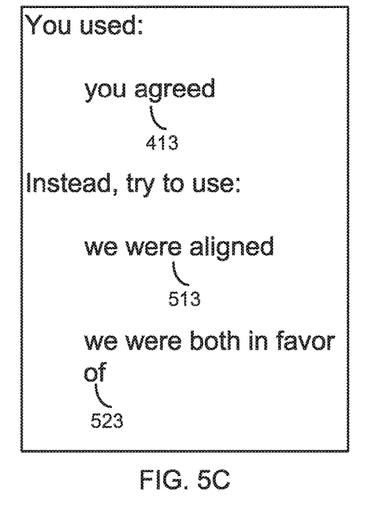
Figure 5D:
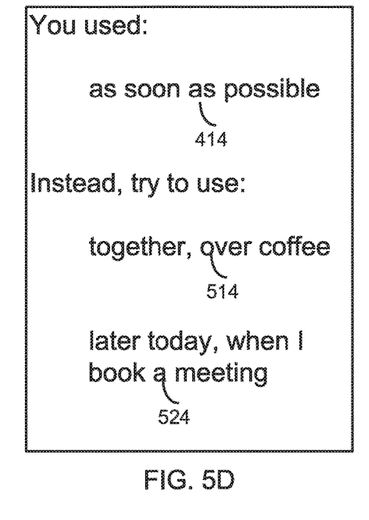

FIG. 4 is an operational example of emotional indication identifiers, in accordance with at least one embodiment of the present invention. In the embodiment depicted in FIG. 4, the emotional indication identifier 411 identifies an emotional indication triggered by the use of the phrase "shocked." The emotional indication identifier 412 identifies an emotional indication triggered by the use of the phrase "you agreed." The emotional indication identifier 413 identifies an emotional indication triggered by the use of the phrase "to disagree." The emotional indication identifier 414 identifies an emotional indication triggered by the use of the phrase "as soon as possible."

FIGS. 5A, 5B, 5C, and 5D are operational examples of corrective suggestions, in accordance with at least one embodiment of the present invention. The corrective suggestions depicted in FIGS. 5A, 5B, 5C, and 5D are determined based on the emotional indications identified in FIG. 4. The corrective suggestion depicted in FIG. 5A offers alternative phrasings 511 (indicating the phrase "surprised") and 521 (indicating the phrase "disappointed") for the emotional indication identifier 411 triggered by the phrase "shocked." The corrective suggestion depicted in FIG. 5B offers alternative phrasings 512 (indicating the phrase "to differ in perspective") and 522 (indicating the phrase "to have different points of view") for the emotional indication identifier 412 triggered by the phrase "to disagree." The corrective suggestion depicted in FIG. 5C offers alternative phrasings 513 (indicating the phrase "we were aligned") and 523 (indicating the phrase "we were both in favor of") for the emotional indication identifier 413 triggered by the phrase "you agreed." The corrective suggestion depicted in FIG. 5D offers alternative phrasings 514 (indicating the phrase "together, over coffee") and 524 (indicating the phrase "later today, when I book a meeting") for the emotional indication identifier 414 triggered by the phrase "as soon as possible."

In some embodiments, the emotion detection program identifies one or more preventive rules and determining whether to perform the one or more respective actions further comprises, responsive to the one or more emotional indications satisfying at least one of the one or more preventive rules, rejecting any request to transmit the one or more input information artefacts. In at least some embodiments, a preventive rule is any rule that, when satisfied, recommends and/or requires that the transmission of at least one of the one or more input information artefacts be prevented.

In some embodiments, determining whether to perform the one or more responsive actions comprises: identifying one or more monitored emotions; determining, for each of the one or more monitored emotions, an emotional threshold; determining, for each of the one or more monitored emotions, an emotional value indicator associated with the one or more input information artefacts; and determining whether, for each of the one or more monitored emotions, the emotional value indicator exceeds the emotional threshold.

In at least some embodiments, a monitored emotion is any indication of any value, variable, category of values, and/or category of variables that can, at least at one time and under one set of one or more conditions, trigger at least one emotional indication during regular, non-exceptional executions. In at least some embodiments, a threshold value associated with a monitored emotion is any indication of any value that, when exceeded with respect to the one or more input information artefacts, the one or more input information artefacts is determined and/or estimated (e.g., with a predefined level of certainty, such as 90% certainty) to have attained a higher level, category, and/or degree of emotional severity as it relates to the monitored emotion. In some embodiments, one or more threshold values associated with a monitored emotion indicate the boundaries between one or more different levels, categories, and/or degree groupings of one or more sets of one or more input information artefacts as it relates to the monitored emotion. In at least some embodiments, an emotional value indicator associated with the one or more input information artefacts is any indication of the emotional severity of the one or more input information artefacts as it relates to a monitored emotion.

In some embodiments, determining, for each of the one or more monitored emotions, the emotional threshold is performed based on one or more recipient profiles associated with the one or more input information artefacts. In at least some embodiments, a recipient profile is any indication of one or more information artefacts associated with a party intended to and/or determined to be a recipient of the one or more input information artefacts upon successful transmission of the one or more input information artefacts.

In some embodiments, determining, for each of the one or more monitored emotional values, the emotional value indicator comprises performing at least one analysis selected from the group consisting of: (i) language analysis; (ii) vocabulary analysis; (iii) punctuation analysis; (iv) keyboard pressure analysis; (v) touch screen pressure analysis; (vi) typing speed analysis; (vii) facial recognition analysis; (viii) eye tracking analysis; (ix) time analysis; and (x) biological analysis.

In at least some embodiments, language analysis is any analysis of the syntax and/or semantics of at least one of the one or more input information artefacts. In at least some embodiment, vocabulary analysis is any analysis of at least one compositional unit (e.g., at least one word, morpheme, term, and/or phrase) of at least one of the one or more input information artefacts. In at least some embodiments, punctuation analysis is any analysis of the organization, sentence structure, and/or typographical features (e.g., spacing and/or conventional signs) of at least one of the one or more input information. In at least some embodiments, keyboard pressure analysis is any analysis of at least of one measure of the pressure exerted when at least one of the one or more input information was inputted by at least one user of at least one computer system environment through a keyboard. In at least some embodiments, touch screen pressure analysis is any analysis of at least one measure of the pressure exerted when at least one of the one or more input information was inputted by at least one user of at least one computer system environment through a touch screen user interface. In at least some embodiments, typing pressure analysis is any analysis of at least of one measure of the speed exerted when at least one of the one or more input information was typed by at least one user of at least one computer system environment.

In at least some embodiments, facial recognition analysis is any analysis of at least one facial attribute of at least one user who at least at one time inputs at least one of the one or more input information artefacts into at least one computer system environment. In at least some embodiments, eye tracking analysis is any analysis of at least one eyesight feature and/or eye movement of at least one user who at least at one time inputs at least one of the one or more input information artefacts into at least one computer system environment. In at least some embodiments, time analysis is any analysis of a time and/or date within which at least one of the one or more input information was inputted by at least one user of at least computer system environment. In at least some embodiments, biological analysis is any analysis of at least one biological attribute (e.g., heart rate, body temperature, and/or blood pressure) experienced by at least one user who at least at one time inputs at least one of the one or more input information artefacts into at least one computer system environment.

In some embodiments, the emotion detection program determines one or more authors associated with the one or more input information artefacts and determines a behavioral profile associated with the one or more authors. In those embodiments, determining, for each of the one or more monitored emotions, the emotional threshold is performed based on the behavioral profile. In at least some embodiments, the one or more authors of the one or more input information artefacts includes any user and/or user profile identified as and/or determined to be a source of at least one of the one or more input information artefacts. In at least some embodiments, a behavioral profile associated with the one or more authors is any indication of one or more determined and/or learned features, behavioral attributes and/or properties of the one or more authors (e.g., based on the status of the one or more authors and/or past communications of the one or more authors); and/or any indication of one or more recommendations and/or requirements that are determined with respect to communications originating from, in whole or in part and directly or indirectly, the one or more authors. In some embodiments, the behavioral profile associated with the one or more authors is determined and/or learned based on at least one of user learning or system learning.

In general, one or more steps of different embodiments of the emotion detection program may be performed based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In general, one or more steps of different embodiments of the emotion detection program may comprise communicating with one or more computer (hardware or software) components, issuing one or more computer instructions (e.g., one or more special purpose machine-level instructions defined in the instruction set of one or more computer hardware components), and/or communicating with one or more computer components at the hardware level.

Aspects of the present invention allow for detection and rendering of emotional indications contained information artefacts using data provided by at least one of content and input properties. As such, aspects of the present invention allow for monitoring of emotional indications contained in information artefacts using a diverse set of properties associated with the information artefacts. In addition, aspects of the present invention allow for determining corrective suggestions based on such monitoring. Nevertheless, the aforementioned advantages are not required to be present in all of the embodiments of the invention and may not be present in all of the embodiments of the invention.

Figure 6:
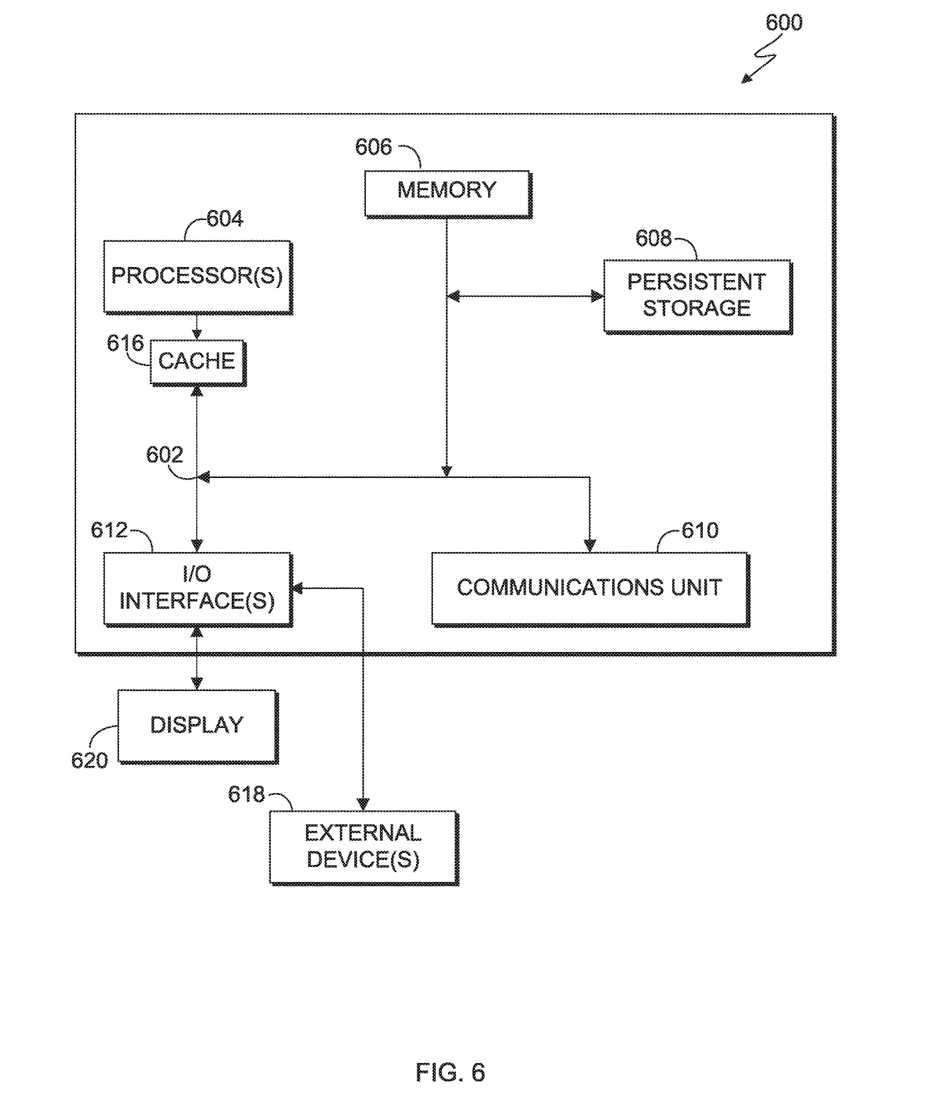
FIG. 6 is a block diagram of a computing apparatus suitable for executing an emotion detection program, in accordance with at least one embodiment of the present invention.

FIG. 6 is a block diagram depicting components of a computer 600 suitable for executing the emotion detection program. FIG. 6 displays the computer 600, the one or more processor(s) 604 (including one or more computer processors), the communications fabric 602, the memory 606, the RAM, the cache 616, the persistent storage 608, the communications unit 610, the I/O interfaces 612, the display 620, and the external devices 618. It should be appreciated that FIG. 6 provides only an illustration of one embodiment and does not imply any limitations with regard to the environments in which different embodiments may be implemented. Many modifications to the depicted environment may be made.

As depicted, the computer 600 operates over a communications fabric 602, which provides communications between the cache 616, the computer processor(s) 604, the memory 606, the persistent storage 608, the communications unit 610, and the input/output (I/O) interface(s) 612. The communications fabric 602 may be implemented with any architecture suitable for passing data and/or control information between the processors 604 (e.g., microprocessors, communications processors, and network processors, etc.), the memory 606, the external devices 618, and any other hardware components within a system. For example, the communications fabric 602 may be implemented with one or more buses or a crossbar switch.

The memory 606 and persistent storage 608 are computer readable storage media. In the depicted embodiment, the memory 606 includes a random access memory (RAM). In general, the memory 606 may include any suitable volatile or non-volatile implementations of one or more computer readable storage media. The cache 616 is a fast memory that enhances the performance of computer processor(s) 604 by holding recently accessed data, and data near accessed data, from memory 606.

Program instructions for the emotion detection program may be stored in the persistent storage 608 or in memory 606, or more generally, any computer readable storage media, for execution by one or more of the respective computer processors 604 via the cache 616. The persistent storage 608 may include a magnetic hard disk drive. Alternatively, or in addition to a magnetic hard disk drive, the persistent storage 608 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of the persistent storage 608.

The communications unit 610, in these examples, provides for communications with other data processing systems or devices. In these examples, the communications unit 610 may include one or more network interface cards. The communications unit 610 may provide communications through the use of either or both physical and wireless communications links. The emotion detection program may be downloaded to the persistent storage 608 through the communications unit 610. In the context of some embodiments of the present invention, the source of the various input data may be physically remote to the computer 600 such that the input data may be received and the output similarly transmitted via the communications unit 610.

The I/O interface(s) 612 allows for input and output of data with other devices that may operate in conjunction with the computer 600. For example, the I/O interface 612 may provide a connection to the external devices 618, which may include a keyboard, keypad, a touch screen, and/or some other suitable input devices. External devices 618 may also include portable computer readable storage media, for example, thumb drives, portable optical or magnetic disks, and memory cards. Software and data used to practice embodiments of the present invention may be stored on such portable computer readable storage media and may be loaded onto the persistent storage 608 via the I/O interface(s) 612. The I/O interface(s) 612 may similarly connect to a display 620. The display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    identifying one or more input information artefacts;
    determining at least one of one or more input properties or one or more content properties, said one or more input properties and said one or more content properties each being associated with said one or more input information artefacts;
    determining whether said one or more input information artefacts comprise one or more emotional indications based on at least one of said one or more input properties or said one or more content properties;
    determining whether to perform a plurality of responsive actions based on said one or more emotional indications, wherein said plurality of responsive actions includes:
        presenting an alternative phrasing for at least one of said one or more emotional indications;
        determining an emotional hierarchical profile, said emotional hierarchical profile being associated with said one or more input information artefacts, and said emotional hierarchical profile includes an indication of the hierarchy, grouping, and ordering of the at least one emotional indication based on an emotional severity associated with the one or more emotional indications, said emotional severity is identified and determined based on the one or more content properties and the one of more input properties using one or more guidelines; and
        determining at least one emotional stabilization strategy, said at least one emotional stabilization strategy is an indication of at least one recommendation and requirement determined based on the one or more emotional indications, said at least one recommendation includes inviting a user to take one or more actions and attempt to transmit an indication of the one or more input information artefacts to at least one recipient;
    identifying one or more monitored emotions;
    displaying the one or more monitored emotions by automatically emphasizing the one or more emotional indications on a display device in response to the identification;
    determining one or more authors, said one or more authors being associated with said one or more input information artefacts;
    determining a behavioral profile associated with said one or more authors, wherein the behavioral profile includes one or more behavioral attributes of the one or more authors determined based, at least in part, on one or more historical input information artefacts previously associated with the one or more authors, and wherein the behavioral profile is determined and learned based on user learning and machine learning; and
    determining, for said one or more monitored emotions, an emotional threshold based on said behavioral profile.

2. The computer-implemented method of claim 1, wherein said plurality of responsive actions comprises at least one action selected from the group consisting of:
    displaying one or more emotional indication identifiers;
    determining one or more corrective suggestions based on said one or more emotional indications; and
    determining one or more notification prompts based on said one or more emotional indications.

3. The computer-implemented method of claim 1, further comprising:
    identifying one or more preventive rules; and
    wherein determining whether to perform said plurality of responsive actions further comprises:
        responsive to said one or more emotional indications satisfying at least one of said one or more preventive rules, rejecting any request to transmit said one or more input information artefacts.

4. The computer-implemented method of claim 1, wherein determining whether to perform said plurality of responsive actions comprises:
    determining, for each of said one or more monitored emotions, said emotional threshold;
    determining, for each of said one or more monitored emotions, an emotional value indicator, said emotional value indicator being associated with said one or more input information artefacts; and
    determining whether, for each of said one or more monitored emotions, said emotional value indicator exceeds said emotional threshold.

5. The computer-implemented method of claim 4, wherein determining, for each of said one or more monitored emotions, said emotional threshold is performed based on one or more recipient profiles, said one or more recipient profiles being associated with said one or more input information artefacts.

6. The computer-implemented method of claim 4, wherein determining, for each of said one or more monitored emotions, said emotional value indicator comprises performing at least one analysis selected from the group consisting of:
   language analysis;
   vocabulary analysis;
   punctuation analysis;
   keyboard pressure analysis;
   touch screen pressure analysis;
   typing speed analysis;
   facial recognition analysis;
   eye tracking analysis;
   time analysis; and
   biological analysis.

7. A computer program product, comprising one or more computer readable storage media and program instructions stored on said one or more computer readable storage media, said program instructions comprising instructions to:
   identify one or more input information artefacts;
   determine at least one of one or more input properties or one or more content properties, said one or more input properties and said one or more content properties each being associated with said one or more input information artefacts;
   determine whether said one or more input information artefacts comprise one or more emotional indications based on at least one of said one or more input properties or said one or more content properties;
   determining whether to perform a plurality of responsive actions based on said one or more emotional indications, wherein said plurality of responsive actions includes:
      presenting an alternative phrasing for at least one of said one or more emotional indications;
      determining an emotional hierarchical profile, said emotional hierarchical profile being associated with said one or more input information artefacts, and said emotional hierarchical profile includes an indication of the hierarchy, grouping, and ordering of the at least one emotional indication based on an emotional severity associated with the one or more emotional indications, said emotional severity is identified and determined based on the one or more content properties and the one of more input properties using one or more guidelines; and
      determining at least one emotional stabilization strategy, said at least one emotional stabilization strategy is an indication of at least one recommendation and requirement determined based on the one or more emotional indications, said at least one recommendation includes inviting a user to take one or more actions and attempt to transmit an indication of the one or more input information artefacts to at least one recipient;
   identifying one or more monitored emotions;
   displaying the one or more monitored emotions by automatically emphasizing the one or more emotional indications on a display device in response to the identification;
   determine one or more authors, said one or more authors being associated with said one or more input information artefacts;
   determine a behavioral profile associated with said one or more authors, wherein the behavioral profile includes one or more behavioral attributes of the one or more authors determined based, at least in part, on one or more historical input information artefacts previously associated with the one or more authors; and
   determine, for said one or more monitored emotions, an emotional threshold based on said behavioral profile.

8. The computer program product of claim 7, wherein said plurality of responsive actions comprises at least one action selected from the group consisting of:
   displaying one or more emotional indication identifiers;
   determining one or more corrective suggestions based on said one or more emotional indications; and
   determining one or more notification prompts based on said one or more emotional indications.

9. The computer program product of claim 7, wherein said program instructions further comprise instructions to:
   identifying one or more preventive rules; and
   wherein said instructions to determine whether to perform said responsive actions further comprise instructions to:
      responsive to said one or more emotional indications satisfying at least one of said one or more preventive rules, reject any request to transmit said one or more input information artefacts.

10. The computer program product of claim 7, wherein said instructions to determine whether to perform said plurality of responsive actions comprise instructions to:
    determine, for each of said one or more monitored emotions, said emotional threshold;
    determine, for each of said one or more monitored emotions, an emotional value indicator, said emotional value indicator being associated with said one or more input information artefacts; and
    determine whether, for each of said one or more monitored emotions, said emotional value indicator exceeds said emotional threshold.

11. The computer program product of claim 10, wherein said instructions to determine, for each of said one or more monitored emotions, said emotional threshold are performed based on one or more recipient profiles, said one or more recipient profiles being associated with said one or more input information artefacts.

12. The computer program product of claim 10, wherein said instructions to determine, for each of said one or more monitored emotions, said emotional value indicator comprises instructions to perform at least one analysis selected from the group consisting of:
    language analysis;
    vocabulary analysis;
    punctuation analysis;
    keyboard pressure analysis;
    touch screen pressure analysis;
    typing speed analysis;
    facial recognition analysis;
    eye tracking analysis;
    time analysis; and
    biological analysis.

13. A computer system comprising:
    a processor;
    one or more computer readable storage media;
    computer program instructions;

said computer program instructions being stored on said one or more computer readable storage media; and said computer program instructions comprising instructions to:
- identify one or more input information artefacts;
- determine at least one of one or more input properties or one or more content properties, said one or more input properties and said one or more content properties each being associated with said one or more input information artefacts;
- determine whether said one or more input information artefacts comprise one or more emotional indications based on at least one of said one or more input properties or said one or more content properties;
- determining whether to perform a plurality of responsive actions based on said one or more emotional indications, wherein said plurality of responsive actions includes:
  - presenting an alternative phrasing for at least one of said one or more emotional indications;
  - determining an emotional hierarchical profile, said emotional hierarchical profile being associated with said one or more input information artefacts, and said emotional hierarchical profile includes an indication of the hierarchy, grouping, and ordering of the at least one emotional indication based on an emotional severity associated with the one or more emotional indications, said emotional severity is identified and determined based on the one or more content properties and the one of more input properties using one or more guidelines; and
  - determining at least one emotional stabilization strategy, said at least one emotional stabilization strategy is an indication of at least one recommendation and requirement determined based on the one or more emotional indications, said at least one recommendation includes inviting a user to take one or more actions and attempt to transmit an indication of the one or more input information artefacts to at least one recipient;
- identifying one or more monitored emotions;
- displaying the one or more monitored emotions by automatically emphasizing the one or more emotional indications on a display device in response to the identification;
- determine one or more authors, said one or more authors being associated with said one or more input information artefacts;
- determine a behavioral profile associated with said one or more authors, wherein the behavioral profile includes one or more behavioral attributes of the one or more authors determined based, at least in part, on one or more historical input information artefacts previously associated with the one or more authors; and
- determine, for said one or more monitored emotions, an emotional threshold based on said behavioral profile.

14. The computer system of claim 13, wherein said plurality of responsive actions comprises at least one action selected from the group consisting of:
- displaying one or more emotional indication identifiers;
- determining one or more corrective suggestions based on said one or more emotional indications; and
- determining one or more notification prompts based on said one or more emotional indications.

15. The computer system of claim 13, wherein said instructions to determine whether to perform said plurality of actions comprise instructions to:
- determine, for each of said one or more monitored emotions, said emotional threshold;
- determine, for each of said one or more monitored emotions, an emotional value indicator, said emotional value indicator being associated with said one or more input information artefacts; and
- determine whether, for each of said one or more monitored emotions, said emotional value indicator exceeds said emotional threshold.

16. The computer system of claim 15, wherein said instructions to determine, for each of said one or more monitored emotions, said emotional threshold are performed based on one or more recipient profiles, said one or more recipient profiles being associated with said one or more input information artefacts.

17. The computer system of claim 15, wherein said instructions to determine, for each of said one or more monitored emotions, said emotional value indicator comprise instructions to perform at least one analysis selected from the group consisting of:
- language analysis;
- vocabulary analysis;
- punctuation analysis;
- keyboard pressure analysis;
- touch screen pressure analysis;
- typing speed analysis;
- facial recognition analysis;
- eye tracking analysis;
- time analysis; and
- biological analysis.

* * * * *